United States Patent
Wu et al.

(10) Patent No.: US 12,326,078 B2
(45) Date of Patent: Jun. 10, 2025

(54) EFFECTIVE RESISTIVITY MODELS FOR GEOSTEERING DECISIONS

(71) Applicant: Halliburton Energy Services, Inc., Houston, TX (US)

(72) Inventors: Dagang Wu, Houston, TX (US); Hsu-Hsiang Wu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/355,172

(22) Filed: Jul. 19, 2023

(65) Prior Publication Data

US 2025/0027400 A1    Jan. 23, 2025

(51) Int. Cl.
| | | |
|---|---|---|
| *G01V 3/20* | (2006.01) | |
| *E21B 7/04* | (2006.01) | |
| *E21B 44/00* | (2006.01) | |
| *E21B 47/0228* | (2012.01) | |

(52) U.S. Cl.
CPC ................ *E21B 44/00* (2013.01); *E21B 7/04* (2013.01); *E21B 47/0228* (2020.05); *G01V 3/20* (2013.01); *E21B 2200/20* (2020.05)

(58) Field of Classification Search
CPC .............................. E21B 47/0228; G01V 3/20
See application file for complete search history.

(56) References Cited

U.S. PATENT DOCUMENTS

| | | |
|---|---|---|
| 6,163,155 A | 12/2000 | Bittar |
| 6,381,542 B1 | 4/2002 | Zhang et al. |
| 6,476,609 B1 | 11/2002 | Bittar |
| 6,541,979 B2 | 4/2003 | Omeragic |
| 6,788,065 B1 | 9/2004 | Homan et al. |
| 6,798,208 B2 | 9/2004 | Omeragic |
| 6,819,110 B2 | 11/2004 | Omeragic et al. |

(Continued)

FOREIGN PATENT DOCUMENTS

| | | |
|---|---|---|
| AU | 2010351029 B2 | 10/2013 |
| CN | 101460698 A | 6/2009 |

(Continued)

OTHER PUBLICATIONS

"U.S. Appl. No. 13/502,571, Advisory Action mailed Oct. 17, 2016", 4 pgs.

(Continued)

*Primary Examiner* — Giovanna Wright
(74) *Attorney, Agent, or Firm* — DeLizio, Peacock, Lewin & Guerra LLP (57) ABSTRACT

A method comprises obtaining measurement data of a subsurface formation while drilling a wellbore in the subsurface formation. The method comprises generating a horizontal resistivity model of the subsurface formation at respective depths along the wellbore based on the measurement data. The method comprises generating a vertical resistivity model of the subsurface formation at the respective depths along the wellbore based on the measurement data. The method comprises generating an effective resistivity at the respective depths along the wellbore based on the horizontal resistivity model and the vertical resistivity model to indicate a formation resistivity in each direction of the wellbore. The method comprises performing a drilling operation based on the effective resistivity.

20 Claims, 8 Drawing Sheets

(56) References Cited

U.S. PATENT DOCUMENTS

| | | |
|---|---|---|
| 6,911,824 B2 | 6/2005 | Bittar |
| 6,937,021 B2 | 8/2005 | Rosthal |
| 6,998,844 B2 | 2/2006 | Omeragic et al. |
| 7,019,528 B2 | 3/2006 | Bittar |
| 7,138,803 B2 | 11/2006 | Bittar |
| 7,202,670 B2 | 4/2007 | Omeragic et al. |
| 7,265,552 B2 | 9/2007 | Bittar |
| 7,385,400 B2 | 6/2008 | Moore |
| 7,557,579 B2 | 7/2009 | Bittar |
| 7,557,580 B2 | 7/2009 | Bittar |
| 8,680,865 B2 | 3/2014 | Zhang et al. |
| 9,310,511 B2 | 4/2016 | Itskovich |
| 9,791,586 B2 | 10/2017 | Bittar et al. |
| 11,299,978 B2 | 4/2022 | Song et al. |
| 2003/0030439 A1 | 2/2003 | Li et al. |
| 2003/0051914 A1 | 3/2003 | Bittar |
| 2003/0055566 A1 | 3/2003 | Kriegshauser et al. |
| 2003/0085707 A1 | 5/2003 | Minerbo |
| 2004/0154831 A1 | 8/2004 | Seydoux et al. |
| 2004/0232986 A1 | 11/2004 | Hirose et al. |
| 2005/0024060 A1 | 2/2005 | Bittar |
| 2005/0140373 A1 | 6/2005 | Li et al. |
| 2005/0140374 A1 | 6/2005 | Itskovich |
| 2005/0189946 A1 | 9/2005 | Moore |
| 2005/0212520 A1 | 9/2005 | Horman et al. |
| 2006/0011385 A1* | 1/2006 | Seydoux .............. G01V 3/28 324/333 |
| 2006/0244455 A1 | 11/2006 | Bittar |
| 2007/0168133 A1 | 7/2007 | Bennett et al. |
| 2007/0235225 A1 | 10/2007 | Bittar |
| 2008/0078580 A1 | 4/2008 | Bittar |
| 2008/0143336 A1 | 6/2008 | Legendre et al. |
| 2008/0246486 A1 | 10/2008 | Forgang et al. |
| 2009/0015261 A1 | 1/2009 | Yang et al. |
| 2009/0224764 A1 | 9/2009 | Bittar |
| 2009/0237084 A1 | 9/2009 | Itskovich et al. |
| 2009/0302851 A1 | 12/2009 | Bittar et al. |
| 2009/0309600 A1 | 12/2009 | Seydoux et al. |
| 2010/0030477 A1 | 2/2010 | Yang et al. |
| 2010/0262370 A1 | 10/2010 | Bittar et al. |
| 2010/0326669 A1* | 12/2010 | Zhu .............. G01V 11/00 703/2 |
| 2011/0191029 A1 | 8/2011 | Jalali et al. |
| 2012/0080197 A1 | 4/2012 | Dickens et al. |
| 2012/0199394 A1 | 8/2012 | Blttar et al. |
| 2012/0306500 A1 | 12/2012 | Bittar et al. |
| 2014/0149040 A1 | 5/2014 | Omeragic et al. |
| 2018/0299572 A1* | 10/2018 | Hou .............. G01V 1/306 |
| 2019/0293830 A1* | 9/2019 | Griffing .............. E21B 49/00 |
| 2019/0390542 A1 | 12/2019 | Song et al. |

FOREIGN PATENT DOCUMENTS

| | | |
|---|---|---|
| EP | 2108982 A2 | 10/2009 |
| GB | 2444800 A | 6/2008 |
| WO | 2007117631 | 10/2007 |
| WO | 2008008386 A2 | 1/2008 |
| WO | 2008076130 A1 | 6/2008 |
| WO | 2008115229 A1 | 9/2008 |
| WO | 2009009342 A1 | 1/2009 |
| WO | 2009029517 A2 | 3/2009 |
| WO | 2009091408 A1 | 7/2009 |
| WO | 2010039757 A1 | 4/2010 |
| WO | 2011129828 A1 | 10/2011 |
| WO | 2014098919 | 6/2014 |
| WO | 2017135960 | 8/2017 |

OTHER PUBLICATIONS

"U.S. Appl. No. 13/502,571, Final Office Action mailed Jun. 25, 2015", 21 pgs.

"U.S. Appl. No. 13/502,571, Final Office Action mailed Jul. 28, 2016", 21 pgs.

"U.S. Appl. No. 13/502,571, Non Final Office Action mailed Jan. 30, 2015", 15 pgs.

"U.S. Appl. No. 13/502,571, Non Final Office Action mailed Dec. 8, 2015", 21 pgs.

"U.S. Appl. No. 13/502,571, Preliminary Amendment mailed Apr. 18, 2012", 3 pgs.

"U.S. Appl. No. 13/502,571, Response filed Mar. 11, 2016 to Non Final Office Action mailed Dec. 8, 2015", 17 pgs.

"U.S. Appl. No. 13/502,571, Response filed Apr. 27, 2015 to Non Final Office Action mailed Jan. 30, 2015", 18 pgs.

"U.S. Appl. No. 13/502,571, Response filed Sep. 28, 2016 to Final Office Action mailed Jul. 28, 2016", 16 pgs.

"U.S. Appl. No. 13/502,571, Response filed Nov. 25, 2015 to Final Office Action mailed Jun. 25, 2015", 16 pgs.

"Australian Patent Application No. 2010351029, First Examiners Report mailed Oct. 18, 2012", 3 pgs.

"Australian Patent Application No. 2010351029, Response filed Sep. 26, 2013 to First Examiners Report mailed Oct. 18, 2012", 20 pgs.

"Canadian Application Serial No. 2,795,219, Office Action mailed May 20, 2016", 3 pgs.

"Canadian Application Serial No. 2,795,219, Office Action mailed May 26, 2015", 3 pgs.

"Canadian Application Serial No. 2,795,219, Office Action mailed May 26, 2015", 4 pgs.

"Canadian Application Serial No. 2,795,219, Office Action mailed Jun. 23, 2016", 3 pgs.

"Canadian Application Serial No. 2,795,219, Response fled Nov. 25, 2014 to Office Action mailed May 26, 2014", 53 pgs.

"Chinese Application Serial No. 201080066207.9, Office Action mailed Aug. 31, 2015", 12 pgs.

"Chinese Application Serial No. 201080066207.9, Office Action mailed Dec. 2, 2014", (w/ English Transaction), 16 pgs.

"Chinese Application Serial No. 201080066207.9, Response filed Apr. 17, 2015 to Office Action mailed Dec. 2, 2014", (w/ English Translation of Amended Claims), 49 pgs.

"Gulf Cooperation Council Application Serial No. 2011/18184, Office Action mailed Jan. 19, 2015", (w/ English Summary), 2 pgs.

"Gulf Cooperation Council Application Serial No. 2011/18184, Office Action mailed Oct. 9, 2015", 5 pgs.

"International Application Serial No. PCT/US10/31243 Search Report mailed Apr. 6, 2011", 7 pgs.

"International Application Serial No. PCT/US10/31243 Written Opinion mailed Apr. 6, 2011", 9 pgs.

"International Application Serial No. PCT/US10/31243, International Preliminary Report on Patentability mailed Oct. 26, 2012", 10 pgs.

"International Application Serial No. PCT/US2010/031243, Invitation to Pay Fees mailed Jan. 26, 2011", 6 pgs.

"Malaysian Application Serial No. PI2011006172, Substantive Examination Clear Report mailed Jun. 30, 2016", 3 pgs.

"United Kingdom Application Serial No. 1122110.8, Amendment filed Dec. 8, 2015", 29 pgs.

"United Kingdom Application Serial No. 1122110.8, Examination Report mailed Jul. 24, 2015", 7 pgs.

"United Kingdom Application Serial No. 1122110.8, Office Action mailed Feb. 9, 2015", 4 pgs.

"United Kingdom Application Serial No. 1122110.8, Response filed Jun. 8, 2015 to Office Action mailed Feb. 9, 2015", 19 pgs.

"U.S. Appl. No. 16/465,288 Final Office Action", Aug. 18, 2021, 22 pages.

"U.S. Appl. No. 16/465,288 Office Action", Mar. 12, 2021, 23 pages.

Bittar, et al., "A New Azimuthal Deep-Reading Resistivity Tool for Geosteering and Advanced Formation Evaluation.", Paper SPE 109971 presented at the SPE Annual Technical Conference and Exhibition, Anaheim, California, 1-9.

"PCT Application No. PCT/US2023/070650, International Search Report and Written Opinion", Apr. 9, 2024, 9 pages.

\* cited by examiner

EFFECTIVE RESISTIVITY MODELS FOR GEOSTEERING DECISIONS

FIELD

The disclosure generally relates to directional drilling and, in particular, identifying geological features while drilling a wellbore through a subsurface formation.

BACKGROUND

In real-time geosteering operations, the location of bed and/or fluid boundaries may be critical information when steering a drill bit through a subsurface formation. Geosteering engineers may steer a drill bit along a path to drill a wellbore in a target formation, and avoid penetrating adjacent formations. Measurements obtained from logging-while-drilling (LWD) sensors on a downhole drilling assembly may be utilized to determine the location of the bed boundaries. For example, measurements of the formation electrical properties may be used to determine formation bed boundary locations, and a geosteering engineer may subsequently make decisions to steer a drill bit to avoid contacting said bed boundaries.

BRIEF DESCRIPTION OF THE DRAWINGS

Implementations of the disclosure may be better understood by referencing the accompanying drawings.

DESCRIPTION

The description that follows includes example systems, methods, techniques, and program flows that embody aspects of the disclosure. However, this disclosure may be practiced without these specific details. For instance, this disclosure refers to resistivity measurements. Aspects of this disclosure may also be applied to any other measurements. For clarity, some well-known details and techniques may be omitted.

Geosteering operations may involve identifying geological features (such as formation bed boundaries, faults, etc.) while drilling a wellbore in a subsurface formation. Formation property measurements (such as electromagnetic (EM) measurements) may be obtained from logging-while-drilling (LWD) tools and transformed, via an inversion process, into visualizations of the geological features surrounding the wellbore. For example, a one-dimensional (1D) resistivity inversion may be used to transform resistivity measurements of the subsurface formation. The formation property measurements may be for different directions in the subsurface formation. For example, horizontal resistivity (Rh) may be the resistivity of the subsurface formation in the horizontal plane of the subsurface formation (i.e., parallel to the layers of the subsurface formation). The vertical resistivity (Rv) may be the resistivity of the subsurface formation in the vertical plane of the subsurface formation (normal to the layers of the subsurface formation).

In some implementations, geosteering operations may utilize two-dimensional (2D) cross-plane visualizations (typically along the wellbore) of the horizontal resistivity and/or vertical resistivity to make geosteering decisions based on the geological features depicted in the visualizations. In conventional approaches, an inverted horizontal resistivity model may be utilized to evaluate the difference in geological features and subsequently make geosteering decisions based on the geological features. This method may be used when utilizing a global anisotropy assumption in the 1D inversion. However, in anisotropic subsurface formations, this method may not be sufficient to capture any variation of the formation electrical properties. For example, two adjacent layers of a subsurface formation may have similar horizontal resistivities but different vertical resistivities.

In some implementations, a local anisotropy inversion may be utilized to resolve more geological features of the layers surrounding the wellbore. Thus, both the horizontal resistivity model and the vertical resistivity model may be used together to accurately distinguish geological features of the layers. However, evaluating both the horizontal and vertical resistivity models at approximately the same time may add an additional burden to the geosteering process during drilling operations. Additionally, both models may present different geological features for the same layer locations because of different inverted resistivity amplitudes (e.g., the vertical resistivity may be greater than the horizontal resistivity of a layer) and different sensitivities to the formations. In some implementations, the visualizations of each model may include color scales corresponding to resistivity values to assist in identifying geological features, resulting in challenges in identifying geological features if layers have similar horizontal and/or vertical resistivities. As further described below, example implementations may be used to help resolve these challenges.

Example implementations relate to generating an effective resistivity model to indicate formation properties in each direction of the wellbore. In some implementations, the subsurface formation may include multiple layers and be anisotropic (i.e., the layers may have different electrical properties, such as resistivity). One or more tools may obtain measurement data of the subsurface formation while drilling a wellbore in a subsurface formation. In some implementations, the measurement data may include measurements of the electrical properties of the subsurface formation, such as resistivity. An inversion process may be used to generate a horizontal resistivity of the subsurface formation at each depth along the wellbore and a vertical resistivity of the subsurface formation at each depth along the wellbore based on the measurement data. In some implementations, an effective resistivity at each depth along the wellbore may be generated based on the horizontal and vertical resistivity at each respective depth. In some implementations, the effective resistivity may be plotted at each respective measured depth (MD) and true vertical depth (TVD) to generate an effective resistivity model in a 2D visualization plane. The effective resistivity visualization may provide any variations of formation resistivity that may not be observed by only the horizontal resistivity model or the vertical resistivity model, based on the similar color scale used for the 2D visualization. For example, two adjacent layers may have similar horizontal resistivities but different vertical resistivities. Thus, the two layers are not distinguishable on the horizontal resistivity visualization but are distinguishable on the vertical resistivity visualization. By generating an effective resistivity model (a single visualization) that accounts for both horizontal and vertical resistivity, the two layers may be distinguishable by utilizing a single visualization.

In some implementations, effective resistivity may be used to perform a drilling operation for a current or future drilling operation. For example, a drilling operation may be initiated, modified, or stopped based on the effective resistivity. Examples of such wellbore operations may include adjusting a wellbore plan for a wellbore being drilled in the subsurface formation, making a steering decision to alter the trajectory of the wellbore, etc. For instance, the effective resistivity visualization may indicate the position of the wellbore relative to the formation bed boundary. Accordingly, in this example situation, a drilling parameter may be adjusted such that the wellbore avoids contacting the formation bed boundary.

Example System

Figure 1:
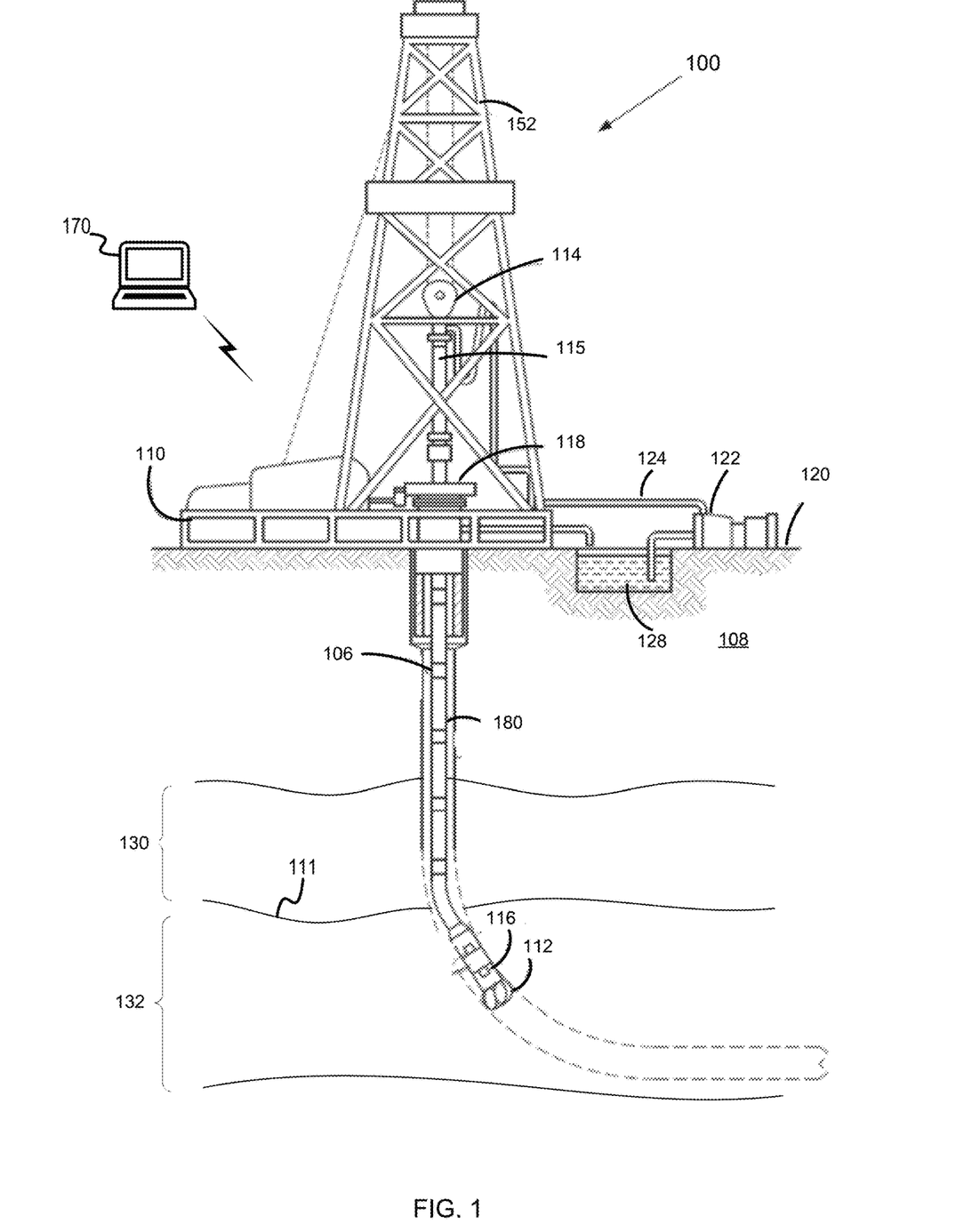
FIG. 1 is a schematic depicting an example well system, according to some implementations.

FIG. 1 is a schematic depicting an example well system, according to some implementations. In particular, FIG. 1 is a schematic diagram of a well system 100 that includes a drill string 180 having a drill bit 112 disposed in a wellbore 106 for drilling the wellbore 106 in the subsurface formation 108. While depicted for a land-based well system, example implementations may be used in subsea operations that employ floating or sea-based platforms and rigs.

The well system 100 may further include a drilling platform 110 that supports a derrick 152 having a traveling block 114 for raising and lowering the drill string 180. The drill string 180 may include, but is not limited to, drill pipe, drill collars, and drilling assembly 116. The drilling assembly 116 may comprise any of a number of different types of tools including a rotary steerable system (RSS), measurement while drilling (MWD) tools, logging while drilling (LWD) tools, mud motors, etc. A kelly 115 may support the drill string 180 as it may be lowered through a rotary table 118. The drill bit 112 may include roller cone bits, polycrystalline diamond compact (PDC) bits, natural diamond bits, any hole openers, reamers, coring bits, and the like. Drilling parameters of drilling the wellbore 106 may be adjusted to increase, decrease, and/or maintain the rate of penetration (ROP) of the drill bit 112 through the subsurface formation 108 and steer the drill bit 112 through the subsurface formation 108. The subsurface formation 108 may include multiple formations such as formations 130, 132. The interface between the formations 130 and 132 may be the formation bed boundary 111. The drilling parameters may assist in steering the wellbore 106 to avoid contact and/or penetration of the formation bed boundary 111. Drilling parameters may include weight-on-bit (WOB) and rotations-per-minute (RPM) of the drill string 180. A pump 122 may circulate drilling fluid through a feed pipe 124 to the kelly 116, downhole through the interior of the drill string 180, through orifices in the drill bit 112, back to the surface 120 via an annulus surrounding the drill string 180, and into a retention pit 128.

In some implementations, various sections of the wellbore 106 such as the vertical, tangent, curve, and horizontal sections may require directional drilling to steer the drill bit 112 on a planned well path and/or keep the wellbore 106 in a target formation. Sensors on the drilling assembly 116, such as gamma ray sensors, porosity sensors, electromagnetic sensors, etc., may log respective measurements while drilling the wellbore 106. The measurement logs may be obtained from the sensors on the drilling assembly 116 and uplinked to the surface 120. In some implementations, the measurements may be communicated to tools on the drilling assembly 116 for processing. The measurements may be processed and utilized to determine the location of the formation bed boundary 111. Steering decisions may be determined based on the wellbore 106 location relative to the formation bed boundary 111 and may be communicated back to the drilling assembly 116 for implementation to maintain the planned well path and/or remain in the target formation. For example, a target formation of the wellbore 106 may be formation 132. Steering decisions may be implemented such that the wellbore 106 may not be drilled through the formation bed boundary 111 and into formation 130.

Figure 8:
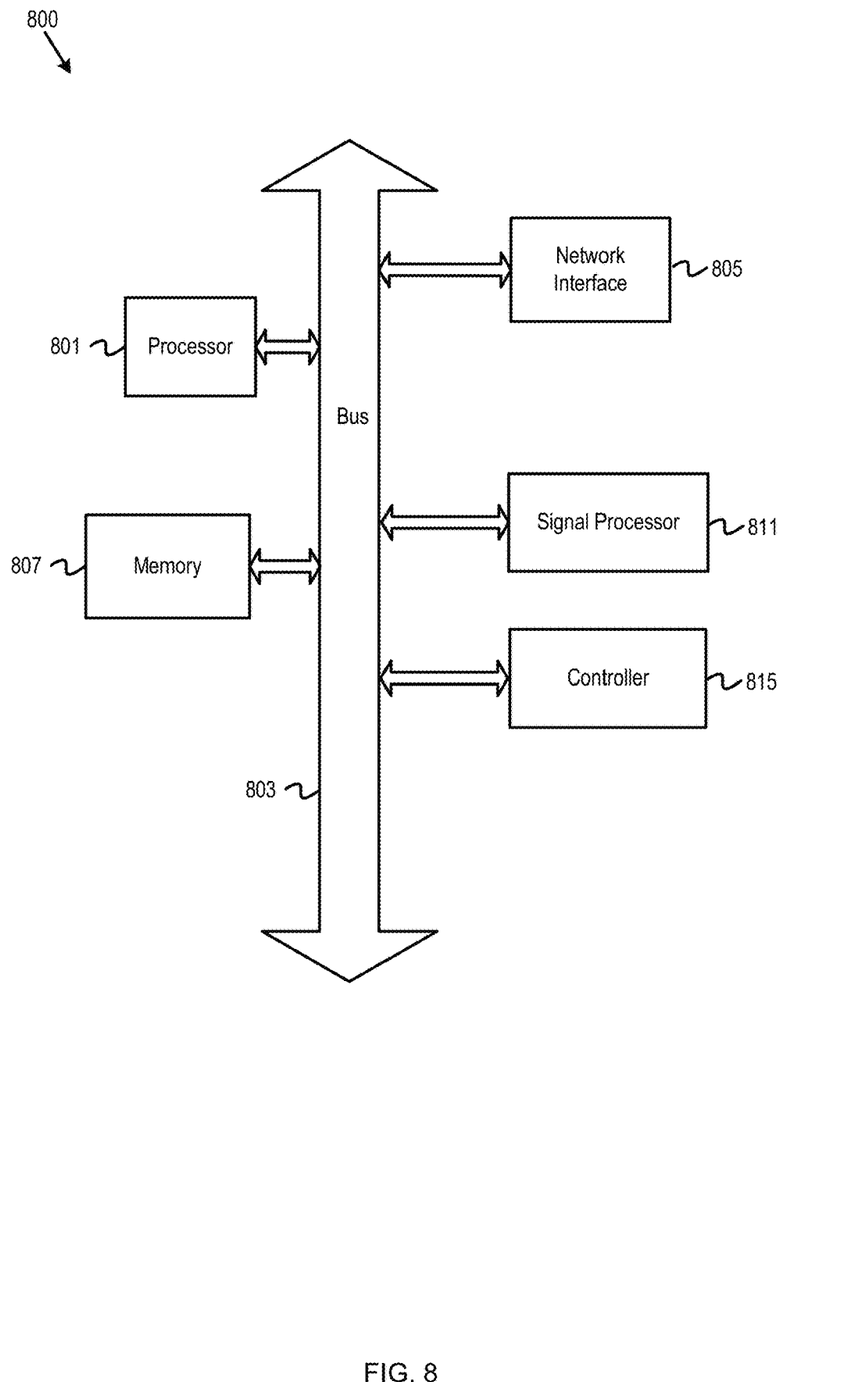
FIG. 8 is a block diagram depicting an example computer, according to some implementations.

The well system 100 includes a computer 170 that may be communicatively coupled to other parts of the well system 100. The computer 170 may be local or remote to the drilling platform 110. A processor of the computer 170 may perform simulations (as further described below). In some implementations, the processor of the computer 170 may control drilling operations of the well system 100 or subsequent drilling operations of other wellbores. For instance, the processor of the computer 170 may generate an effective resistivity model of the subsurface formation based on measurements obtained from sensors in the drilling assembly 116, and drilling operations may be performed based on the effective resistivity model. An example of the computer 170 is depicted in FIG. 8, which is further described below.

Figure 2A:
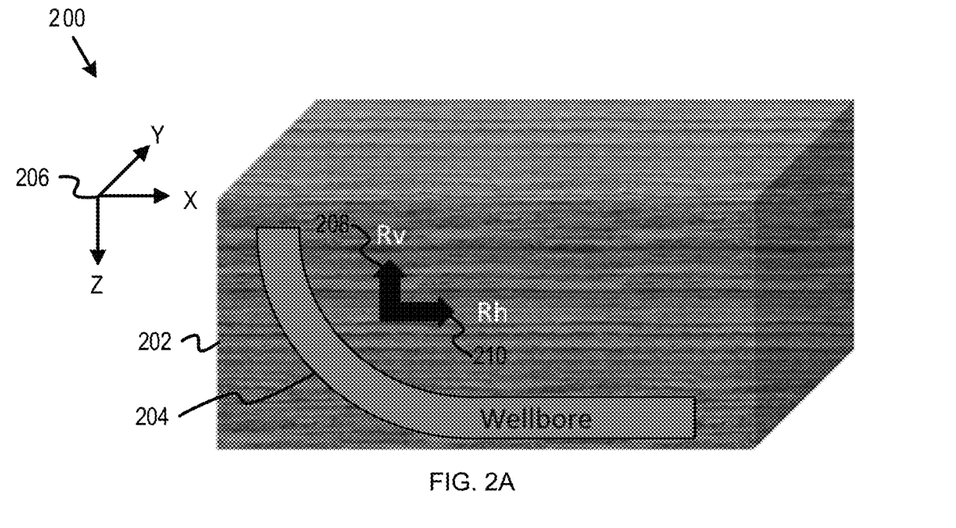
FIGS. 2A-2B are schematics depicting example subsurface formations, according to some implementations.

FIGS. 2A-2B are schematics depicting example subsurface formations, according to some implementations. In particular, FIG. 2A includes a formation model 200 of a subsurface formation 202 with multiple layers. The horizontal plane of the subsurface formation 202 may be in the Y-Z plane, indicated by coordinate system 206, where the layers of the subsurface formation 202 may be approximately parallel to the horizontal plane. The vertical plane of the subsurface formation 202 may be in the X-Z plane, as indicated by coordinate system 206, where the layers of the subsurface formation 202 may be approximately perpendicular to the horizontal plane. In some implementations, as a wellbore 204 is drilled in the subsurface formation 202, formation properties may be obtained. For example, resistivity measurements of the subsurface formation 202 may be obtained while drilling the wellbore 204. The resistivity measurements may include horizontal resistivity 210, measuring resistivity in the horizontal plane of the subsurface formation. The resistivity measurements may also include vertical resistivity 208, measuring resistivity in the vertical plane of the subsurface formation. Each horizontal and vertical measurement may include a corresponding measured depth and TVD, indicating the resistivity measurement with respect to the wellbore. For example, the measured depth may indicate the position of the resistivity measurement along the wellbore 204, and the TVD may indicate the position of the resistivity measurement in the subsurface formation 202. FIG. 2A depicts a 2D schematic with the horizontal resistivity 210 and the vertical resistivity 208 being in the z-direction and the x-direction, respectively.

In some implementations, the resistivity measurements may be three-dimensional (3D), such that an additional horizontal resistivity may be measured in the y-direction. In some implementations, the layers of the subsurface formation 202 may have different respective resistivities (i.e., anisotropic formation). In some implementations, each layer may have an approximately uniform resistivity along its respective horizontal plane.

Figure 2B:
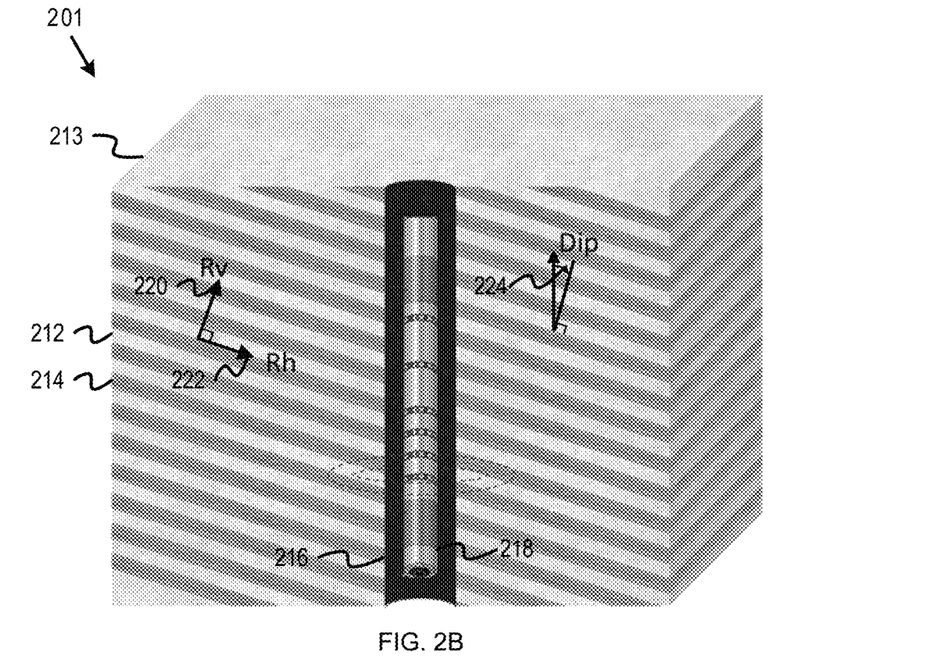

FIG. 2B includes a formation model 201 of a subsurface formation 213 with multiple layers. The subsurface formation 213 includes similar features as subsurface formation 202 of FIG. 2A. For example, the subsurface formation 213 includes layers, such as layers 212 and 214. However, the layers of the subsurface formation 213 depicted in FIG. 2B are at an inclination relative to the vertical direction, as depicted by dip angle 224. Accordingly, the horizontal resistivity 222 may be measured by a tool 218 in a wellbore 216 in the horizontal plane with respect to the dip angle. Additionally, the vertical resistivity 220 may be measured by the tool 218 in the vertical plane with respect to the dip angle 224.

Example Operations

Example operations are now described.

Figure 3:
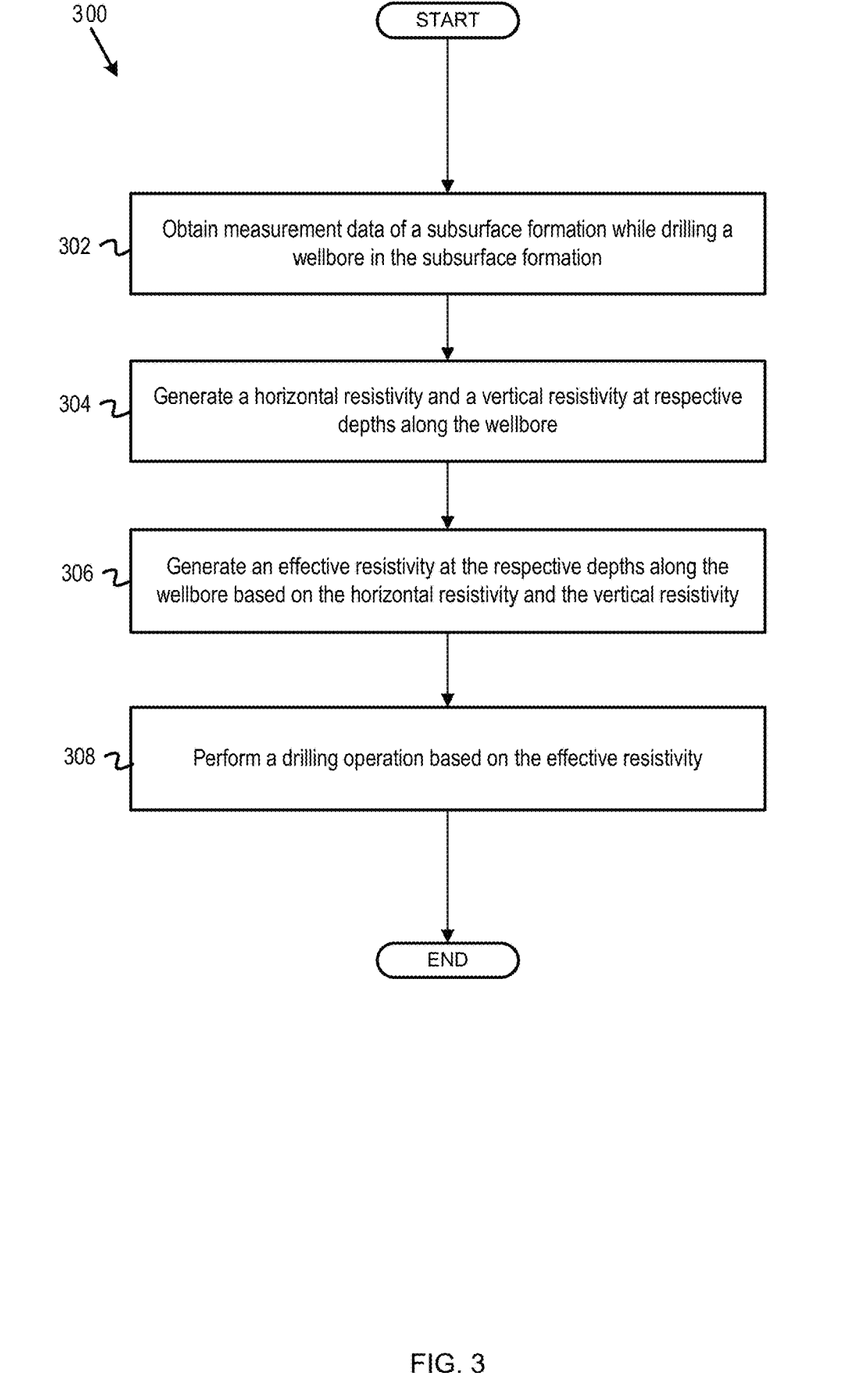
FIG. 3 is a flowchart depicting example operations for generating effective resistivity, according to some implementations.

FIG. 3 is a flowchart depicting example operations for generating effective resistivity, according to some implementations. FIG. 3 includes a flowchart 300 for generating the effective resistivity of the subsurface formation surrounding a wellbore. Operations of flowchart 300 of FIG. 3 are described in reference to the computer 170 of FIG. 1. Additionally, the operations of the flowchart 300 are described in reference to FIGS. 4A-4B, FIGS. 5A-5B, FIGS. 6A-6B, and FIG. 7. The operations of the flowchart 300 are described in reference to electromagnetic measurements (such as resistivity) obtained from LWD tools. In some implementations, the operations of the flowchart 300 may be applied to other measurement data of the subsurface formation properties, such as seismic data from seismic operations. Operations of flowchart 300 start at block 302.

At block 302, the processor of the computer 170 may obtain measurement data of a subsurface formation while drilling a wellbore in the subsurface formation. The measurement data may include measurements of the formation properties at respective depths along the wellbore. For example, electromagnetic measurements (i.e., resistivity measurements) at respective measured depths and true vertical depths of the wellbore may be obtained. The measurements may be in the subsurface formation's horizontal and/or vertical plane (such as resistivity measurements in the horizontal and vertical planes described in FIGS. 2A-2B). The measurement data may be obtained from one or more LWD tools of a drilling assembly while drilling the wellbore. For example, the drilling assembly may include a shallow resistivity tool, a deep resistivity tool, an ultra-deep resistivity tool, etc. each configured to obtain resistivity measurements at different depths of investigation. For instance, an ultra-deep resistivity tool may obtain resistivity measurements of the subsurface formation approximately 200 feet away from the wellbore and a shallow resistivity tool may obtain resistivity measurements from approximately 20 feet away from the wellbore. Each measurement may include a measurement of the formation property at a respective depth along the wellbore (i.e., the measured depth (MD) and the true vertical depth (TVD) of the measurements at the respective MD. For example, one measurement point obtained by the receiver of the ultra-deep resistivity tool at a measured depth along the wellbore may include the resistivity of the formation up to 200 feet into the formation in the vertical plane and the horizontal plane of the formation. In some implementations, the measurement data may include seismic data obtained from seismic operations.

At block 304, the processor of the computer may generate a horizontal resistivity and a vertical resistivity of the subsurface formation at respective depths along the wellbore. The horizontal resistivity may be the resistivity of the horizontal plane of the layers in the subsurface formation (as described in FIGS. 2A-2B). The vertical resistivity may be the resistivity of the vertical plane of the layers in the subsurface formation (as described in FIGS. 2A-2B). In some implementations, an inversion process may be utilized to transform the measurement data into horizontal resistivity and vertical resistivity models. For example, a one-dimensional (1D) inversion process may include comparing the measurement data to an initial model, via a cost function. The model may be iteratively adjusted until the cost function criterion is met, resulting in an inverted measurement data model. In some implementations, the criterion may be met when the cost function may be minimized (i.e., below a threshold). The inversion model may then be utilized to predict formation properties proximate to the measurement locations of the measurement data.

Figure 4A:
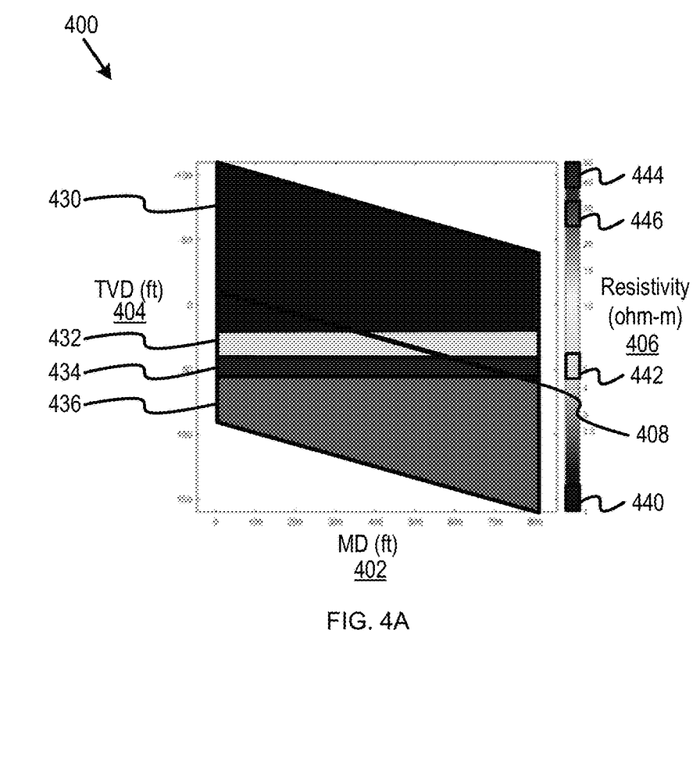
FIGS. 4A-4B are charts depicting example anisotropy formation models, according to some implementations.
Figure 4B:
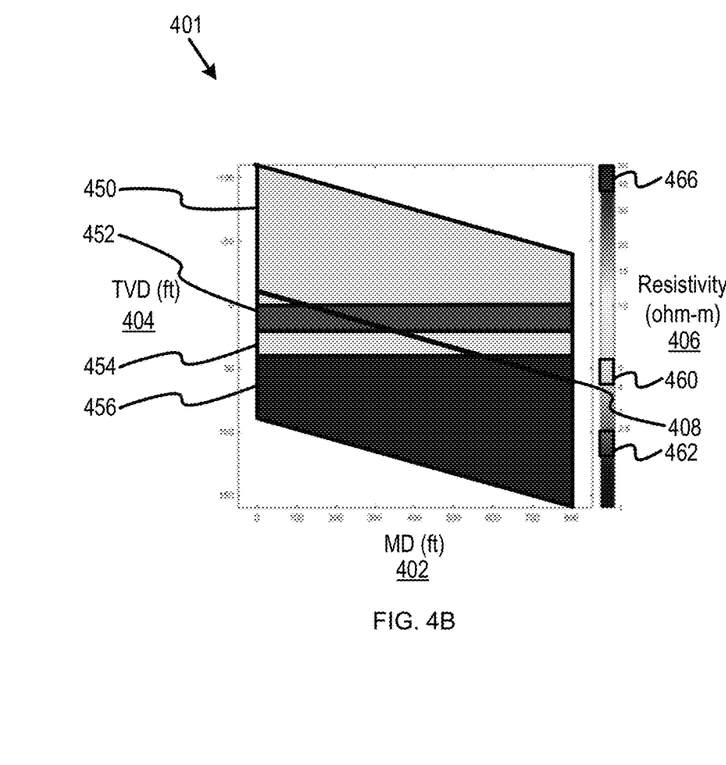

To help illustrate, FIGS. 4A-4B are charts depicting example anisotropy formation models, according to some implementations. The charts of FIGS. 4A-4B may be the input models for an inversion process to transform the measurement data into horizontal and vertical resistivity models. FIG. 4A includes a horizontal resistivity visualization 400 that includes an x-axis 402 and a y-axis 404. The x-axis 402 is the measured depth of the wellbore in feet (ft). The y-axis 404 is the true vertical depth (TVD) in feet (ft). The horizontal resistivity visualization 400 also includes a color scale 406. The color scale 406 is the resistivity around the wellbore 408 measured in ohm-m. The horizontal resistivity visualization 400 may be a formation model of the horizontal resistivity along the wellbore 408. The horizontal resistivity visualization 400 includes area 430 with a resistivity corresponding to area 440 of the color scale 406, area 432 with a resistivity corresponding to area 442 of the color scale 406, area 434 with a resistivity corresponding to area 444 of the color scale 406, and area 436 with a resistivity corresponding to area 446 of the color scale 406. Each area 430-436 may represent a different layer within the subsurface formation.

FIG. 4B includes a vertical resistivity visualization 401 that includes an x-axis 402 and a y-axis 404. The x-axis 402 is the measured depth of the wellbore in feet (ft). The y-axis 404 is the true vertical depth (TVD) in feet (ft). The horizontal resistivity visualization 400 also includes a color scale 406. The color scale 406 is the resistivity around the wellbore 408 measured in ohm-m. The vertical resistivity visualization 401 includes area 450 with a resistivity corresponding to area 460 of the color scale 406, area 452 with a resistivity corresponding to area 462 of the color scale 406, area 454 with a resistivity corresponding to area 460 of the color scale 406, and area 456 with a resistivity corresponding to area 466 of the color scale 406. Each area 450-456 may represent a different layer within the subsurface formation. The subsurface formation may be considered anisotropic due to the different resistivities in each layer. As shown, the horizontal resistivity of the layers depicted in the horizontal resistivity visualization 400 may be different from the vertical resistivity of the layers depicted in the vertical resistivity visualization 401. Additionally, two adjacent layers may have a similar horizontal or vertical resistivity, but different vertical or horizontal resistivity, respectively. For example, the area 430 indicates one resistivity from approximately −110 ft TVD to 20 ft TVD (i.e., area 430 appears to be a single formation layer). However, the vertical resistivity visualization 401 indicates two different resistivity measurements in that same TVD interval (area 450, and area 451). Thus, there may be two layers within the interval from approximately −110 ft TVD to −20 ft TVD. As another example, the area 456 indicates one resistivity from approximately −160 ft TVD to 40 ft TVD. However, the horizontal resistivity visualization 400 indicates two different resistivity measurements in that same interval (area 434, and area 436).

In some implementations, the models depicted in FIGS. 4A-4B may be simulations of responses from one or more sensors. In some implementations, the models may be 1D anisotropy formation models. In some implementations, there may be more than one horizontal resistivity model and/or vertical resistivity model for each resistivity sensor. For example, if the downhole drilling assembly includes a shallow resistivity tool and an ultra-deep resistivity tool, then there may be a horizontal resistivity model and a vertical resistivity model for each respective resistivity tool. The models may be utilized as an input model in the inversion process of the measurement data to generate visualizations of the horizontal resistivity at the depths along the wellbore and the vertical resistivity at the depths along the wellbore.

Figure 5A:
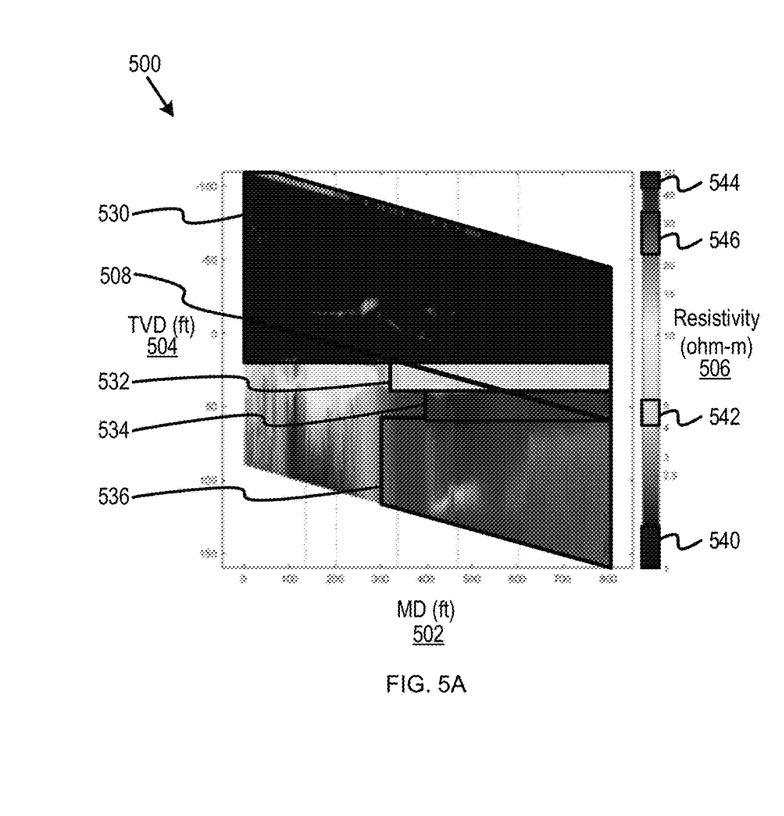
FIGS. 5A-5B are charts depicting examples of global anisotropic inversion results, according to some implementations.
Figure 5B:
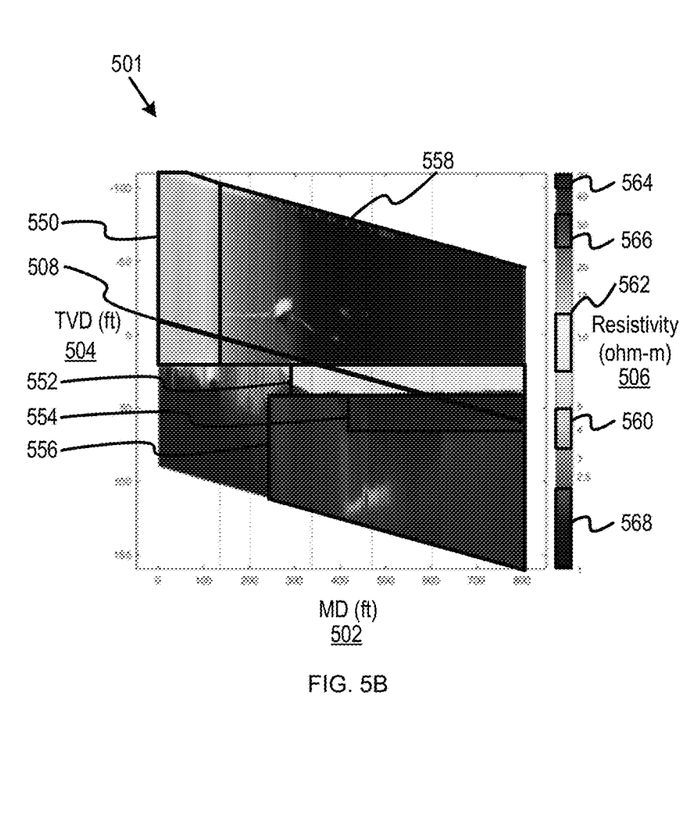

FIGS. 5A-5B are charts depicting examples of global anisotropic inversion results, according to some implementations. FIG. 5A includes a global anisotropy horizontal resistivity visualization 500 that includes an x-axis 502 and a y-axis 504. The x-axis 502 is the measured depth of the wellbore in feet (ft). The y-axis 504 is the true vertical depth (TVD) in feet (ft). The global anisotropy horizontal resistivity visualization 500 also includes a color scale 506. The color scale 506 is the resistivity measured around the wellbore 508 in ohm-m. The global anisotropy horizontal resistivity visualization 500 includes area 530 with a resistivity corresponding to area 540 of the color scale 506, area 532 with a resistivity corresponding to area 542 of the color scale 506, area 534 with a resistivity corresponding to area 544 of the color scale 506, and area 536 with a resistivity corresponding to area 546 of the color scale 506. FIG. 5B includes a global anisotropy vertical resistivity visualization 501 that includes an x-axis 502 and a y-axis 504. The x-axis 502 is the measured depth of the wellbore in feet (ft). The y-axis 504 is the true vertical depth (TVD) in feet (ft). The global anisotropy vertical resistivity visualization 501 also includes a color scale 506. The color scale 506 is the resistivity measured around the wellbore 508 in ohm-m. The global anisotropy vertical resistivity visualization 501 includes area 550 with a resistivity corresponding to area 560 of the color scale 506, area 552 with a resistivity corresponding to area 562 of the color scale 506, area 554 with a resistivity corresponding to area 564 of the color scale 506, area 556 with a resistivity corresponding to area 556 of the color scale 506, and area 558 with a resistivity corresponding to area 568 of the color scale 506. The horizontal resistivity (Rh) along the depths of the wellbore 508 of the global anisotropy horizontal resistivity visualization 500 and the vertical resistivity (Rv) along the depths of the wellbore 508 of the global anisotropy vertical resistivity visualization 501 may be the results of the global 1D inversion process utilizing the 1D anisotropy formation models of FIGS. 4A-4B, respectively, as the input models for the inversion process. In some implementations, the global anisotropy in the 1D inversion may refer to any layers with different horizontal resistivity values having the same anisotropy ratio (Rv/Rh) during the inversion process. This may be utilized to evaluate major geological features in the subsurface formation. However, the anisotropy ratio assumption may not be accurate, due to the fact that some layers may have different anisotropy ratios such as area 534 and area 554.

In some implementations, a local anisotropic 1D inversion may be utilized to invert different anisotropy ratios for different Rh layers. Although this approach may result in increasing the number of inversion unknowns (i.e., both Rh and Rv have to be inverted at each location, rather than just Rh in the global inversion process), the inversion may be able to provide more geological variations along the vertical resistivity direction. Additionally, the inversion may be able to provide more realistic geological models of the subsurface formation.

Figure 6A:
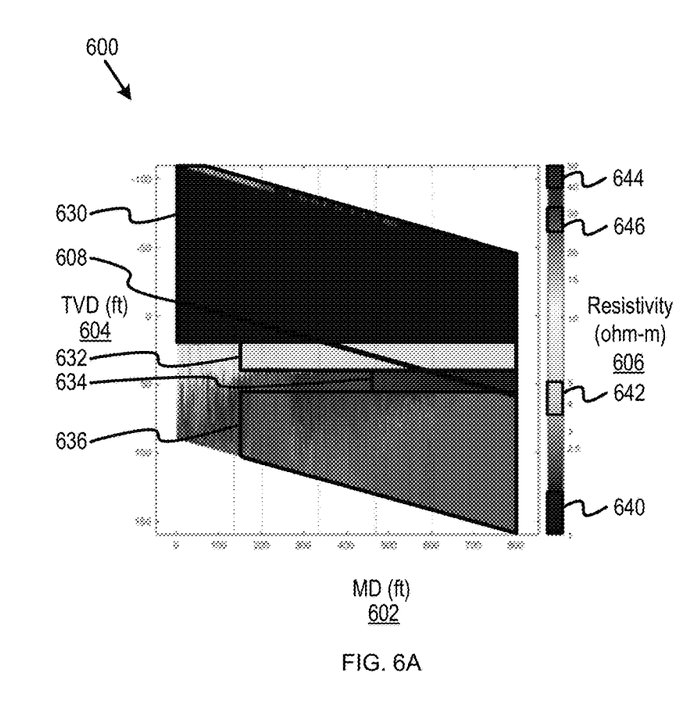
FIGS. 6A-6B are charts depicting examples of local anisotropic inversion results, according to some implementations.
Figure 6B:
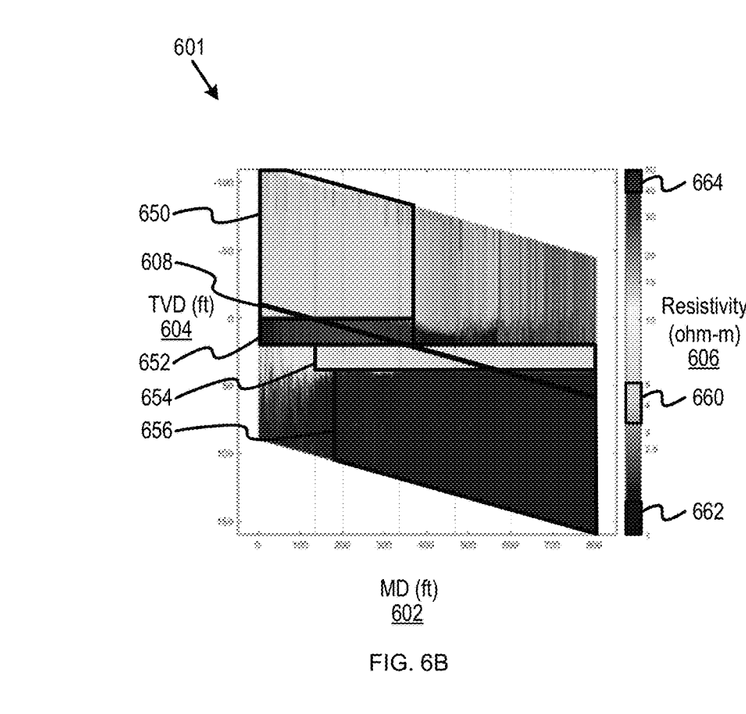

To help illustrate, FIGS. 6A-6B are charts depicting examples of local anisotropic inversion results, according to some implementations. FIG. 6A includes a local anisotropy horizontal resistivity visualization 600 that includes an x-axis 602 and a y-axis 604. The x-axis 602 is the measured depth of the wellbore in feet (ft). The y-axis 604 is the true vertical depth (TVD) in feet (ft). The local anisotropy horizontal resistivity visualization 600 also includes a color scale 606. The color scale 606 is the resistivity measured around the wellbore 608 in ohm-m. The local anisotropy horizontal resistivity visualization 600 includes area 630 with a resistivity corresponding to area 640 of the color scale 606, area 632 with a resistivity corresponding to area 642 of the color scale 606, area 634 with a resistivity corresponding to area 644 of the color scale 606, and area 636 with a resistivity corresponding to area 646 of the color scale 606. FIG. 6B includes a local anisotropy vertical resistivity visualization 601 that includes an x-axis 602 and a y-axis 604. The x-axis 602 is the measured depth of the wellbore in feet (ft). The y-axis 604 is the true vertical depth (TVD) in feet (ft). The local anisotropy vertical resistivity visualization 601 also includes a color scale 606. The color scale 606 is the resistivity measured around the wellbore 608 in ohm-m. The local anisotropy vertical resistivity visualization 601 includes area 650 with a resistivity corresponding to area 660 of the color scale 606, area 652 with a resistivity corresponding to area 662 of the color scale 606, area 654 with a resistivity corresponding to area 660 of the color scale 606, and area 656 with a resistivity corresponding to area 664 of the color scale 606. The horizontal resistivity (Rh) along the depths of the wellbore 608 of the local anisotropy horizontal resistivity visualization 600 and the vertical resistivity (Rv) along the depths of the wellbore 608 of the local anisotropy vertical resistivity visualization 601 may be the results of the local 1D inversion process utilizing the 1D anisotropy formation models of FIGS. 4A-4B, respectively, where the inversion process uses different anisotropy layers for each layer.

Thus, with the local anisotropy inversion results (as depicted in FIGS. 6A-6B), the Rh and Rv two-dimensional visualizations may be required to distinguish layers with different resistivity properties along the horizontal and vertical directions. During the geosteering process, both visualizations may be utilized to make geosteering decisions. However, viewing both visualizations may introduce an additional burden to the operations, for evaluating both Rh and Rv models simultaneously may be challenging during drilling operations.

Returning to the flowchart 300, at block 306, the processor of the computer may generate an effective resistivity at the respective depths along the wellbore based on the horizontal resistivity and the vertical resistivity. The effective resistivity may be a value that accounts for both the horizontal resistivity and the vertical resistivity for each respective measured depth and TVD along the wellbore. The effective resistivity may indicate the formation resistivity in each direction of the wellbore as a single value. For example, the effective resistivity, represented by $R_{eff}$ (using Equation 1 below), may be defined as follows:

$$R_{eff} = \sqrt{R_h \times R_v} \quad R_{eff} = \sqrt{R_h \times R_v} \tag{1}$$

Where Rh is the horizontal resistivity and Rv is the vertical resistivity. Equation 1 may average the amplitude of the respective resistivities. In some implementations, there may my more than one Rh and Rv measurement. For instance, if a downhole drilling assembly includes multiple resistivity tools, then there may be an Rh and Rv for each respective tool. In some implementations, the effective resistivity may be generated for each measurement data set obtained from each LWD tool. For example, the effective resistivity may be generated for a shallow resistivity tool and an ultra-deep resistivity tool on the downhole drilling assembly. The Rh and Rv may be the local inversion results of FIGS. 6A-6B.

In some implementations, each of the effective resistivity values may be plotted at the respective measured depth and TVD to generate a visualization of the effective resistivity (i.e., an effective resistivity model). The visualization may be a two-dimensional visualization plane that may indicate a formation property measurement of the subsurface formation (such as resistivity) in each direction surrounding the wellbore. Thus, the single visualization may be utilized to identify geological features based on multiple formation property measurements. In some implementations, Rh may include resistivity measurements from both the x-direction and y-direction (according to the coordinate system 206 of FIG. 2A). For example, the effective resistivity, $R_{eff}$, of Equation 1 may be updated to include the two measurements from the horizontal play (using Equation 2) and may be defined as follows:

$$R_{eff} = \sqrt{R_x \times R_y \times R_z}. \tag{2}$$

Where Rx is the x-direction, Ry is the y-direction, and Rz is the z-direction, according to the coordinate system 206 of FIG. 2A. Accordingly, the effective resistivity visualization may be a three-dimensional model to include both the measurement dataset from the horizontal plane and the measurement dataset in the vertical plane. In some implementations, Rx may be approximately similar or different than Ry.

Figure 7:
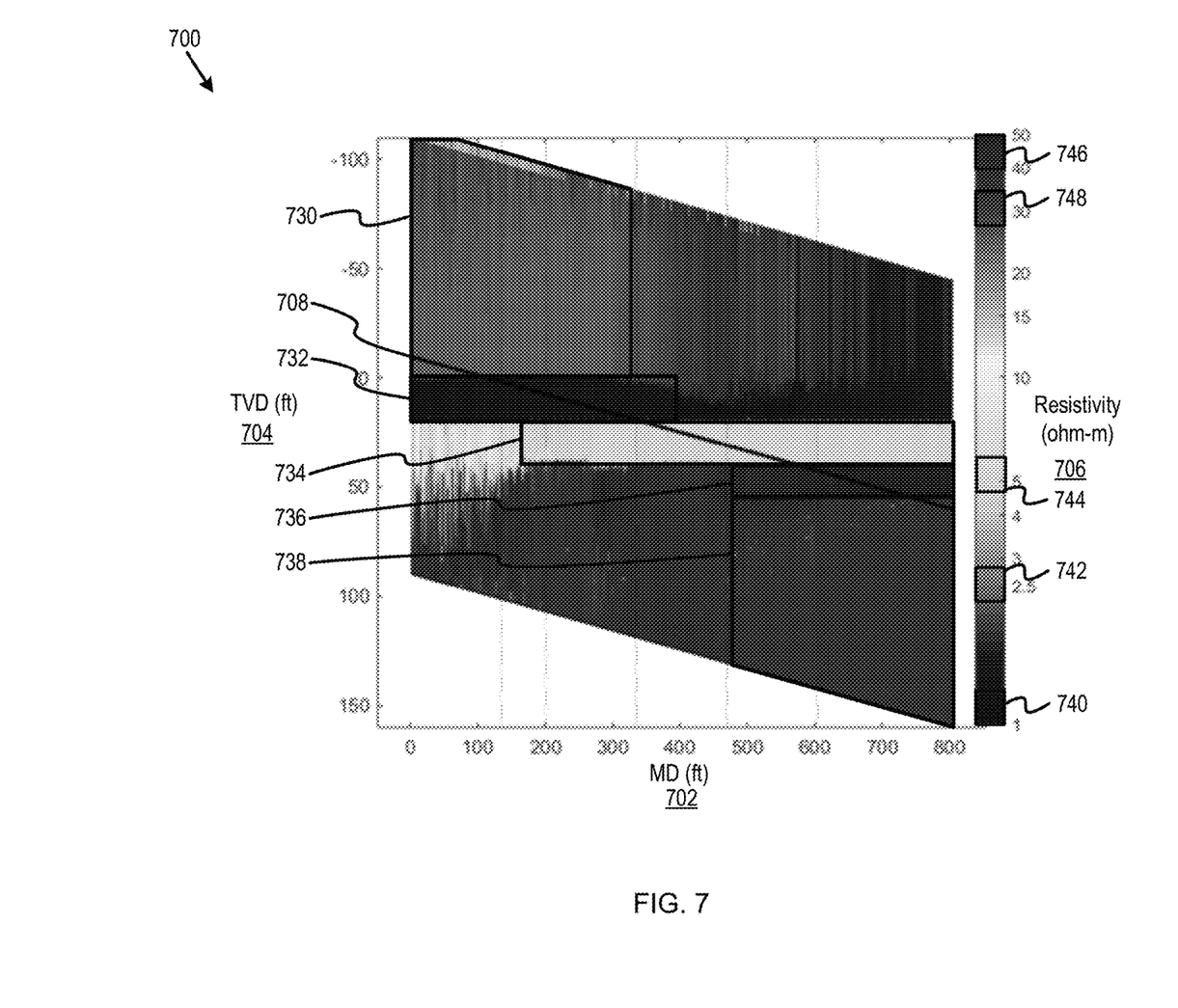
FIG. 7 is a chart depicting an example of effective resistivity visualization, according to some implementations.

To help illustrate, FIG. 7 is a chart depicting an example of effective resistivity visualization, according to some implementations. In particular, FIG. 7 includes a chart 700 of the effective resistivity at each measured depth along the wellbore, generated from the local anisotropy inversion results, Rh and Rv, of FIGS. 6A-6B. In some implementations, the chart 700 may be generated in a user interface of a display device (such as computer 170) to be analyzed during geosteering operations. The chart 700 includes an x-axis 702 and a y-axis 704. The x-axis 702 is the measured depth of the wellbore in feet (ft). The y-axis 704 is the true vertical depth (TVD) in feet (ft). The chart 700 also includes a color scale 706. The color scale 706 is the resistivity measured around the wellbore 708 in ohm-m. The chart 700 includes area 730 with a resistivity corresponding to area 742 of the color scale 706, area 732 with a resistivity corresponding to area 740 of the color scale 706, area 734 with a resistivity corresponding to area 744 of the color scale 706, area 736 with a resistivity corresponding to area 746 of the color scale 706, and area 738 with a resistivity corresponding to area 748 of the color scale 706. As shown, each layer interface between the subsurface formation layers (represented by areas 730-738) having different resistivities can be visualized. This effective resistivity model may provide a single visualization to monitor geological features (such as layer interfaces), rather than multiple visualizations as depicted in FIGS. 5A-5B and FIGS. 6A-6B.

In some implementations, additional formation layer properties may be included with the effective resistivity model to distinguish different resistivity properties into one 2D visualization. The additional formation layer properties may include the formation dip effect, three-dimensional resistivity properties, etc. For example, to account for the dip angle effect, the effective resistivity, represented by $R_{eff}$ (using Equation 3 below), may be defined as follows:

$$R_{eff} = f(dip, \lambda) \times \sqrt{R_h \times R_v} \tag{3}$$

where f(dip, λ) is a function of the formation dip and local anisotropy ratio, $\lambda = \sqrt{R_v/R_h}$. For example, f(dip, λ) (using Equation 4 below), may be defined as follows:

$$f(dip, \lambda) = 1/\sqrt{\lambda^2 \cos^2(dip) + \sin^2(dip)} \tag{4}$$

In some implementations, the effective resistivity may include a scaling factor. For example, to include a scaling factor, the effective resistivity, represented by $R_{eff}$ (Using Equation 5 below), may be defined as follows:

$$R_{eff} = \sqrt{R_h \times R_v} \times S \tag{5}$$

Where S is a scaling factor that may be calculated based on multi-component signals measured from one or multiple sensors. Multi-component signals may be estimated using the inverted Rh, Rv, and dip angle models from the inversion results. For example, a formation model with Rh=1, Rv=4, and dip angle=90 degrees may end up with the same effective resistivity with another formation model with Rh=2, Rv=2, and dip angle=90. However, if the multi-component signals are generated (e.g., XX, YY, ZZ, etc.), then the formation models may acquire different amplitudes for the respective components. For example, if XX component is generated, then the formation models may acquire different XX component amplitudes, resulting in different scaling factor amplitudes for the effective resistivity. Then, the layers with similar $R_h \times R_v$ values may become more distinguishable.

In some implementations, the scaling factor may be utilized to generate the effective resistivity value for each pixel of the 2D visualization (such as the chart 700 of FIG.

7) based on the normalized modeling components (i.e., the XX component). For example, for a pixel at MD position of i and a TVD position of j, the Rh(i,j) and Rv(i,j) may be acquired from the inversion results (such as the local inversion results described in block 304). The modeling responses for the components (i.e., XX(i,j)) may be generated based on Rh(i,j), Rv(i,j), and possible dip angle (the dip angle may be constant for all pixels, or different dip angle for each respective pixel). Additionally, a reference component may be generated. For example, reference XX component, represented by XXref may be defined as XXref=XX(i,jwell), where jwell is the TVD location of the wellbore at the MD of i. The effective resistivity, represented by $R_{\it eff}(i,j)$ (using Equation 6 below), may be defined as follows:

$$R_{\it eff}(i,j) = \sqrt{R_h(i,j) \times R_v(i,j)} \times \frac{XX(i,j)}{XX(i,j_{well})} \quad (6)$$

The XX component may be replaced by YY, ZZ, or any other multi-components, or any other combination of available multi-component signals.

In some implementations, for three-dimensional (3D) resistivity properties (e.g., the horizontal resistivity may include resistivity in the x and y direction as shown in FIG. 2A), Equation 6 may be extended to be define $R_{\it eff}(i,j,k)$ (using Equation 7) as follows:

$$R_{\it eff}(i,j,k) = \sqrt{R_x(i,j,k) \times R_y(i,j,k) \times R_z(i,j,k)} \times S(i,j,k) \quad (7)$$

Where i, j, and k are the x, y, and z direction as illustrated in FIG. 2A, respectively. Rx(i,j,k) is the x direction resistivity properties at the position (i,j,k). Similar definitions may be used for the Ry and Rz properties. The scaling factor, S(i,j,k) can be equal to 1 or be estimated based on the multi-component signals approach mentioned above.

In some implementations, different averaging methods compared to the averaging method of Equation 1 can be used to describe the effective resistivity model. For example, effective resistivity, represented by $R_{\it eff}(i,j,k)$ (using Equations 8 or 9 below), may be defined as follows:

$$R_{\it eff}(i,j,k) = \frac{R_x(i,j,k) + R_y(i,j,k) + R_z(i,j,k)}{3} \times S(i,j,k) \quad (8)$$

or $$R_{\it eff}(i,j,k) = \frac{3}{\frac{1}{R_x(i,j,k)} + \frac{1}{R_y(i,j,k)} + \frac{1}{R_z(i,j,k)}} \times S(i,j,k) \quad (9)$$

At block 308, the processor of the computer 170 may perform a drilling option based on the effective resistivity. Geological features may be determined from the effective resistivity. For example, formation bed boundaries between layers, such as layers indicated by areas 730-738 of FIG. 7, may be determined based on the different effective resistivities (indicated by the color scale) at respective TVDs along the wellbore. Accordingly, the actual formation resistivities along any direction (horizontal resistivity and vertical resistivity) may be further investigated and/or analyzed by assessing the Rh and/or Rv model, such as FIGS. 6A-6B. In some implementations, the effective resistivity does not represent the actual resistivity of the formation, but rather indicates the resistivity surrounding the wellbore. Thus, if the effective resistivity model indicates a potential formation bed boundary, the actual resistivity values (horizontal resistivity and/or vertical resistivities values) may be evaluated to determine the geological feature. Once a formation bed boundary is determined, a drilling operation may be performed. For example, drilling parameters may be adjusted to steer a drill bit drilling the wellbore such that the drill bit does not penetrate a formation bed boundary, a planned well path may be adjusted, drilling may stop, etc.

Example Computer

FIG. 8 is a block diagram depicting an example computer, according to some implementations. FIG. 8 depicts a computer 800 that includes a processor 801 (possibly including multiple processors, multiple cores, multiple nodes, and/or implementing multi-threading, etc.). The computer 800 includes a memory 807. The memory 807 may be system memory or any one or more of the above already described possible realizations of machine-readable media. The computer 800 also includes a bus 803 and a network interface 805.

The computer 800 also includes a signal processor 811. The signal processor 811 may perform one or more of the operations described herein. For example, the signal processor 811 may process measurement data, such as measurements obtained from multiple sensors, and generate an effective resistivity along the depths of the wellbore. In response to the effective resistivity, a controller 815 may perform various operations to a drilling operation. For example, the controller 815 may perform a drilling operation based on a formation bed boundary based on the effective resistivity.

Any one of the previously described functionalities may be partially (or entirely) implemented in hardware and/or on the processor 801. For example, the signal processor 811 may include machine-readable instructions, some of which may reside in the memory 807 and may be executed on the processor 801. The functionality described may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for fusing control points to generate a curve indicating a formation bed boundary as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Implementations Implementation #1: A method comprising: obtaining measurement data of a subsurface formation while drilling a wellbore in the subsurface formation; generating a horizontal resistivity model of the subsurface formation at respective depths along the wellbore based on the measurement data; generating a vertical resistivity model of the subsurface formation at the respective depths along the wellbore based on the measurement data; generating an effective resistivity at the respective depths along the wellbore based on the horizontal resistivity model and the vertical resistivity model to indicate a formation resistivity in each direction of the wellbore; and performing a drilling operation based on the effective resistivity.

Implementation #2: The method of Implementation #1, wherein the measurement data includes resistivity measurements at respective depths along the wellbore.

Implementation #3: The method of Implementation #2, wherein the resistivity measurements are obtained from one or more sensors including a shallow resistivity tool and an ultra-deep resistivity tool.

Implementation #4: The method of Implementation #3, wherein the horizontal resistivity model includes a plurality of horizontal resistivities each corresponding to a respective sensor, and wherein the vertical resistivity model includes a plurality of vertical resistivities each corresponding to the respective sensor.

Implementation #5: The method of Implementation #4, wherein the plurality of horizontal resistivities include resistivity measurements in an x-direction and a y-direction, wherein the plurality of vertical resistivities include resistivity measurements in a z-direction, and wherein the plurality of horizontal resistivities in the x-direction are approximately similar or different to the plurality of horizontal resistivities in the y-direction.

Implementation #6: The method of any one or more of Implementations #1-5, further comprising: generating the horizontal resistivity model and the vertical resistivity model at the respective depths along the wellbore via an inversion method.

Implementation #7: The method of any one or more of Implementations #1-6, wherein the effective resistivity is an average of the horizontal resistivity model respective amplitudes and the vertical resistivity model respective amplitudes.

Implementation #8: The method of any one or more of Implementations #1-7, wherein the effective resistivity is based on one or more formation layer properties including a formation dip and a local anisotropy ratio.

Implementation #9: The method of any one or more of Implementations #1-8, wherein the effective resistivity is plotted at each respective depth to generate a visualization of the effective resistivity in a user interface on a display device, and wherein the visualization is a two-dimensional visualization plane or a three-dimensional visualization space.

Implementation #10: The method of Implementation #9, further comprising: identifying a formation boundary based on the visualization; and performing the drilling operation based on the visualization, wherein the drilling operation includes steering a drill bit in the subsurface formation.

Implementation #11: A system comprising: one or more sensors configured to obtain measurement data while drilling a wellbore in a subsurface formation; a processor; and a computer-readable medium having instructions stored thereon that are executable by the processor to cause the processor to perform the following operations, obtain the measurement data of the subsurface formation while drilling the wellbore in the subsurface formation; generate a horizontal resistivity model of the subsurface formation at respective depths along the wellbore based on the measurement data; generate a vertical resistivity model of the subsurface formation at the respective depths along the wellbore based on the measurement data; generate an effective resistivity at the respective depths along the wellbore based on the horizontal resistivity model and the vertical resistivity model to indicate a formation resistivity in each direction of the wellbore; and perform a drilling operation based on the effective resistivity.

Implementation #12: The system of Implementation #11, wherein the measurement data includes resistivity measurements at respective depths along the wellbore.

Implementation #13: The system of Implementation #11 or 12, wherein the resistivity measurements are obtained from the one or more sensors including a shallow resistivity tool and an ultra-deep resistivity tool.

Implementation #14: The system of Implementation #13, wherein the horizontal resistivity model includes a plurality of horizontal resistivities each corresponding to a respective sensor, and wherein the vertical resistivity model includes a plurality of vertical resistivities each corresponding to the respective sensor.

Implementation #15: The system of any one or more of Implementations #11-14, further comprising: generating the horizontal resistivity model and the vertical resistivity model at the respective depths along the wellbore via an inversion method.

Implementation #16: The system of any one or more of Implementations #11-15, wherein the effective resistivity is an average of the horizontal resistivity model respective amplitudes and the vertical resistivity model respective amplitudes.

Implementation #17: The system of any one or more of Implementations #11-16, wherein the effective resistivity is plotted at each respective depth to generate a visualization of the effective resistivity in a user interface on a display device, and wherein the visualization is a two-dimensional visualization plane or a three-dimensional visualization space.

Implementation #18: The system of Implementation #17, further comprising: identifying a formation boundary based on the visualization; and performing the drilling operation based on the visualization, wherein the drilling operation includes steering a drill bit in the subsurface formation.

Implementation #19: A non-transitory, computer-readable medium having instructions stored thereon that are executable by a processor to perform operations comprising: obtaining measurement data of a subsurface formation while drilling a wellbore in the subsurface formation; generating a horizontal resistivity model of the subsurface formation at respective depths along the wellbore based on the measurement data; generating a vertical resistivity model of the subsurface formation at the respective depths along the wellbore based on the measurement data; generating an effective resistivity at the respective depths along the wellbore based on the horizontal resistivity model and the vertical resistivity model to indicate a formation resistivity in each direction of the wellbore; and performing a drilling operation based on the effective resistivity.

Implementation #20: The non-transitory, computer-readable medium of Implementation #19, wherein the effective resistivity is plotted at each respective depth to generate a visualization of the effective resistivity in a user interface on a display device, and wherein the visualization is a two-dimensional visualization plane or a three-dimensional visualization space.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" may be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. A method comprising:
   obtaining, via one or more sensors on a drilling assembly, measurement data of a subsurface formation while drilling a wellbore in the subsurface formation;
   generating a horizontal resistivity model of the subsurface formation at respective depths along the wellbore based on the measurement data;
   generating a vertical resistivity model of the subsurface formation at the respective depths along the wellbore based on the measurement data;
   generating an effective resistivity at the respective depths along the wellbore based on the horizontal resistivity model and the vertical resistivity model to indicate a formation resistivity in each direction of the wellbore;
   plotting the effective resistivity at the respective depths to generate a visualization of the effective resistivity in a user interface on a display device; and
   steering a drill bit through the subsurface formation using the visualization of the effective resistivity.

2. The method of claim 1, wherein the measurement data includes resistivity measurements at respective depths along the wellbore.

3. The method of claim 2, wherein the resistivity measurements are obtained from the one or more sensors including a shallow resistivity tool and an ultra-deep resistivity tool.

4. The method of claim 3, wherein the horizontal resistivity model includes a plurality of horizontal resistivities each corresponding to a respective sensor, and wherein the vertical resistivity model includes a plurality of vertical resistivities each corresponding to the respective sensor.

5. The method of claim 4, wherein the plurality of horizontal resistivities include resistivity measurements in an x-direction and a y-direction, wherein the plurality of vertical resistivities include resistivity measurements in a z-direction, and wherein the plurality of horizontal resistivities in the x-direction are approximately similar or different to the plurality of horizontal resistivities in the y-direction.

6. The method of claim 1, further comprising:
   generating the horizontal resistivity model and the vertical resistivity model at the respective depths along the wellbore via an inversion method.

7. The method of claim 1, wherein the effective resistivity is an average of the horizontal resistivity model respective amplitudes and the vertical resistivity model respective amplitudes.

8. The method of claim 1, wherein the effective resistivity is based on one or more formation layer properties including a formation dip and a local anisotropy ratio.

9. The method of claim 1, wherein the visualization is a two-dimensional visualization plane or a three-dimensional visualization space.

10. The method of claim 1, further comprising:
    identifying a formation boundary based on the visualization; and
    steering the drill bit through the subsurface formation using the visualization.

11. A system comprising:
    one or more sensors configured to obtain measurement data while drilling a wellbore in a subsurface formation;
    a processor; and
    a computer-readable medium having instructions stored thereon that are executable by the processor to cause the processor to perform the following operations,
        obtain the measurement data of the subsurface formation while drilling the wellbore in the subsurface formation;
        generate a horizontal resistivity model of the subsurface formation at respective depths along the wellbore based on the measurement data;
        generate a vertical resistivity model of the subsurface formation at the respective depths along the wellbore based on the measurement data;
        generate an effective resistivity at the respective depths along the wellbore based on the horizontal resistivity model and the vertical resistivity model to indicate a formation resistivity in each direction of the wellbore;
        plot the effective resistivity at the respective depths to generate a visualization of the effective resistivity in a user interface on a display device; and
        steer a drill bit through the subsurface formation using the visualization of the effective resistivity.

12. The system of claim 11, wherein the measurement data includes resistivity measurements at respective depths along the wellbore.

13. The system of claim 12, wherein the resistivity measurements are obtained from the one or more sensors including a shallow resistivity tool and an ultra-deep resistivity tool.

14. The system of claim 13, wherein the horizontal resistivity model includes a plurality of horizontal resistivities each corresponding to a respective sensor, and wherein the vertical resistivity model includes a plurality of vertical resistivities each corresponding to the respective sensor.

15. The system of claim 11, further comprising:
    generating the horizontal resistivity model and the vertical resistivity model at the respective depths along the wellbore via an inversion method.

16. The system of claim 11, wherein the effective resistivity is an average of the horizontal resistivity model respective amplitudes and the vertical resistivity model respective amplitudes.

17. The system of claim 11, wherein the visualization is a two-dimensional visualization plane or a three-dimensional visualization space.

18. The system of claim 11, further comprising:
  identifying a formation boundary based on the visualization; and
  steering the drill bit through the subsurface formation using the visualization.

19. A non-transitory, computer-readable medium having instructions stored thereon that are executable by a processor to perform operations comprising:
  obtaining, via one or more sensors on a drilling assembly, measurement data of a subsurface formation while drilling a wellbore in the subsurface formation;
  generating a horizontal resistivity model of the subsurface formation at respective depths along the wellbore based on the measurement data;
  generating a vertical resistivity model of the subsurface formation at the respective depths along the wellbore based on the measurement data;
  generating an effective resistivity at the respective depths along the wellbore based on the horizontal resistivity model and the vertical resistivity model to indicate a formation resistivity in each direction of the wellbore;
  plotting the effective resistivity at the respective depths to generate a visualization of the effective resistivity in a user interface on a display device; and
  steering a drill bit through the subsurface formation using the visualization of the effective resistivity.

20. The non-transitory, computer-readable medium of claim 19, wherein the visualization is a two-dimensional visualization plane or a three-dimensional visualization space.

* * * * *